March 22, 1960 W. E. KIRKPATRICK ET AL 2,929,957

DUAL PICTURE DIRECT VIEW STORAGE TUBE

Filed Dec. 31, 1956 2 Sheets-Sheet 1

INVENTORS: W. E. KIRKPATRICK
R. W. SEARS

BY

ATTORNEY

DUAL PICTURE DIRECT VIEW STORAGE TUBE

Filed Dec. 31, 1956 2 Sheets-Sheet 2

INVENTORS: W. E. KIRKPATRICK
R. W. SEARS

BY [signature]

ATTORNEY 2,929,957

DUAL PICTURE DIRECT VIEW STORAGE TUBE

William E. Kirkpatrick, Chatham, and Raymond W. Sears, West Orange, N.J., assignors to Bell Telephone Laboratories, Incorporated, New York, N.Y., a corporation of New York Application December 31, 1956, Serial No. 631,610

15 Claims. (Cl. 315—12)

This invention relates to cathode ray picture tubes and more particularly to such a tube which is capable of providing a continuous visual display derived from narrow band television signals such as may be transmitted over existing telephone lines as an adjunct to voice telephony.

It is known that such a system requires the transmission of a succession of still pictures at a slow rate, as of the order of one per second, rather than the transmission of normal television pictures and signals. This slow rate of transmission is necessary in order to keep the bandwidth below 4,000 cycles which is the limit imposed by present telephone lines. Systems for transmitting narrow bandwidth television signals have been disclosed and are well known in the art. However, solutions thus far proposed for reconstructing a succession of still pictures at the receiver end so as to provide a continuous visual display with no apparent discontinuity between frames, have left much to be desired from a commercial standpoint. This is due in part to the complexity of the switching circuitry required and also because of the manufacturing difficulties encountered with the cumbersome and intricate grid assemblies utilized in the storage tubes in question.

In United States Patent 2,922,843, issued January 26, 1960, of M. A. Clark, R. L. Miller and R. W. Sears, a display device is disclosed whereby two cathode ray tubes are utilized in conjunction with an optical arrangement for combining the images appearing on the screens of the two tubes. This optical arrangement permits the storage of only one picture at a time, necessitating two storage tubes and switching means for blanking the tube which is not to be viewed.

A single cathode ray tube to display a continuous sequence of still pictures for such a system is disclosed in patent application Serial No. 545,164, filed November 7, 1955, of M. E. Hines and W. E. Kirkpatrick. The tube disclosed therein requires excessive circuitry and switching means due to complicated wave forms required for triggering purposes and because of the numerous frequency multipliers necessary to achieve a continuous visual reproduction.

Other arrangements for displaying a distinct series of still pictures by utilizing a single cathode ray tube are discussed in United States Patents 2,824,360, issued February 18, 1958, of C. C. Culter and 2,879,442, issued March 24, 1959, of R. Kompfner and K. M. Poole. In both of these patent applications, a single cathode ray tube was utilized; however, both tubes require an intricate combination of storage and control grid assemblies in order to attain the desired results.

It is a general object of this invention to achieve a continuous visual display derived from narrow band television signals by the utilization of a single cathode ray tube employing two electron guns.

It is a further object of this invention to provide a direct view storage tube which permits storing, viewing and erasing, independently, two separate and distinct frames of picture information.

Another object of this invention is to provide a direct view storage tube capable of reproducing a continuous visual display with a minimum of storage and control grid elements.

A still further object of this invention is to provide an electron tube of the direct view storage type in which two separate and independent frames of visual picture information appear at substantially the same perception position and may be independently stored, viewed and erased.

These and other objects of this invention are attained in a specific illustrative embodiment wherein there are provided two identical electron gun assemblies symmetrically displaced from the tube axis, which gun assemblies generate pencil electron beams. In addition, there are provided a collimating lens structure, aperture mask, storage grid and luminescent screen for viewing. Due to the focusing effect of the collimating lens structure in conjunction with the aperture mask, two distinct and interleaved charge patterns are stored on the storage screen in alternate fashion. Accordingly, each raster in the write condition constitutes one frame of picture information, the two distinct rasters being interleaved in much the same way as two interlaced fields employed in a conventional television system. In operation, the beam from one gun sweeps out a raster on one interleaved area of the storage grid while the input signal is applied to the modulating grid of that gun. Potential variations related to the input signal are stored as electrostatic charges on the particular interleaved areas of the storage grid scanned. Of course, the proper cathode potential with respect to the storage grid for writing must have been adjusted by suitable means so that a secondary emission ratio greater than unity exists for the insulating material of the storage grid during the complete scan in the write condition. During the time one gun is writing, and assuming that the other gun has stored priorly a frame of picture information, the latter gun is sweeping out a raster for reading on the other interleaved area of the storage grid. The pencil beam for reading is unmodulated and the cathode potential of the gun is adjusted so that electrons do not strike the insulating material. Scanning in the read condition is accomplished by utilization of a local fast raster generator which scans the storage screen at a much faster rate than the sync generator employed for writing. Upon a gun completing its scanning of the storage screen in the read condition, it sweeps out an interleaved raster in accordance with the proper cathode potential and grid bias necessary to erase whatever charge pattern remains on the storage grid after reading. The erasing cycle is actually accomplished during a very short interval of time at the end of the reading cycle.

Immediately upon a gun completing the storage of a frame of picture information, it commences scanning the same interleaved areas of the storage grid in the read condition and with the proper potentials applied to the various gun elements for reading. At the same instant of time, the other gun commences storing another frame of picture information on the other interleaved areas of the storage grid. The input signals are synchronized with the beam scanning raster of the camera tube at the transmitting end in such a manner that one complete picture is stored on each of the two interleaved fields of the storage grid during one scan in an alternate manner. The switching system employed for changing the potentials applied to the various tube elements for writing, reading and erasing is also dependent on synchronization with the frame pulses received from the transmitter end. Accordingly, in accordance with our invention, there is attained the storing, viewing and erasing independently of two separate and distinct frames of picture information.

It is a feature of this invention that two identical electron guns be symmetrically displaced from the axis of the collimating lens system and in a diametral plane with respect to the lens axis.

Another feature of this invention is the utilization of an aperture mask to assure accuracy and reliability in scanning the exact areas of the storage grid defined by two separate and distinct interleaved rasters swept out from the respective electron guns.

A further feature of this invention is the utilization of a collimating lens which insures that the deflection angle of the two off-axis electron beams will always approach the aperture mask at equal but oppositely inclined angles thereby assuring uniformity of spacing between the interleaved lines of the respective rasters.

It is a still further feature of this invention that the storage grid be positioned behind the aperture mask a distance such that the independent and interleaved electron beams from the two off-axis electron guns impinge on distinct and different areas of the storage grid.

A complete understanding of this invention and of these and other features thereof may be gained from consideration of the following detailed description of the accompanying drawing, in which.

Figure 1:
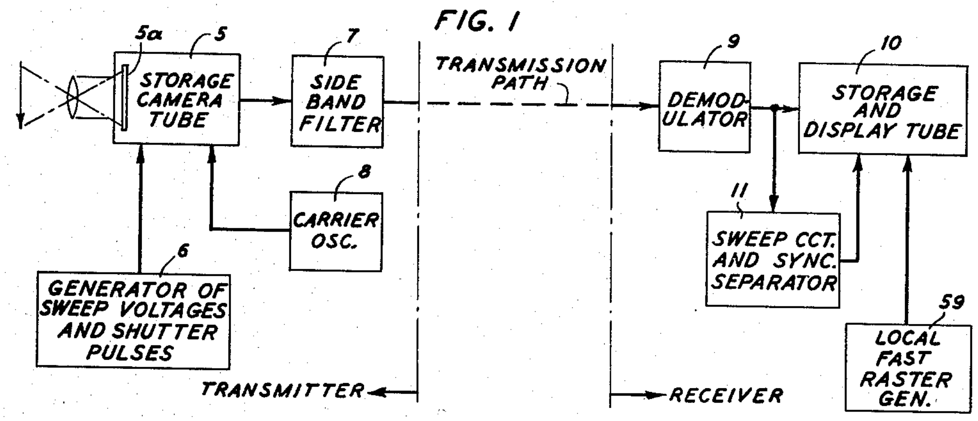
Figure 1 is a block diagram of a slow speed television system of the type in which a storage tube in accordance with our invention may be used.

Referring now more particularly to the drawing, Fig. 1 depicts in block diagram form a slow speed television system of the type in which the present invention may advantageously be utilized.

This system basically comprises a storage camera tube 5, which may be of the iconoscope type, a suitable generator 6 for generating sweep voltages and shutter pulses, a carrier oscillator 8 for supplying a carrier signal to the camera tube, and a sideband filter 7 coupled to the output of the camera tube for further restricting the bandwidth. Since this invention is concerned primarily with the receiving of image signals and their reproduction, it will be sufficent for our purposes to describe the well known elements of the transmitting end in terms of the operation and function of the various elements without elaborating on the specific circuitry. In the operation of camera tube 5 a scene is focused on the target mosaic surface 5*a* of the camera tube, which has a conducting backplate spaced in close proximity to the photo sensitive mosaic.

During each shutter pulse, which is of very short duration compared to the frame rate, electrons are emitted by the mosaic due to the light intensity of a scene which is focused on the mosaic, and a charge pattern related to the scene is established on the mosaic. In the period between shutter pulses, the electron beam is scanned across the mosaic and secondary electrons are released. In accordance with the known operation of iconoscopes, when the electron beam scans across areas of the mosaic which are highly illuminated very few secondary electrons are emitted, and when the beam scans across dimly illuminated areas many secondary electrons are emitted. The secondary electron flow produces, across a load resistor, a voltage which varies as the beam scans across light and dark portions of the image. This varying voltage is the video signal which modulates a carrier wave from oscillator 8 which in turn is passed through the sideband filter and subsequently transmitted. The time interval between successive shutter pulses derived from generator 6 is advantageously made to occur at one second intervals. Thus, the slow scanning rate results in the transmission of fewer elements in a fixed period of time with a consequent reduction in the bandwidth required for signal transmission over existing telephone lines or other restricted mediums of transmission.

At the receiver end of the system, there is provided a conventional demodulator 9 for removing the carrier, a synch separator and sweep generator 11, which is synchronized with the transmitter end, a local fast raster generator 59, and a storage tube 10 embodying the principles of this invention. The necessity of utilizing a local fast raster generator in conjunction with the present invention will become more apparent later on. The scanning rate derived from generator block 11 is synchronized with the scanning rate derived from generator 6 at the transmitting end so that one complete picture is stored during one complete scan of the storage grid by one of the guns. Thus, one complete raster in the write condition constitutes a frame, the time of which is defined by the period between shutter pulses of camera tube 5. This is accomplished by super-imposing on the television signal to be transmitted a pulse train derived from the sweep generator on the transmitter end consisting of shutter, line, and frame pulses.

Figure 2:
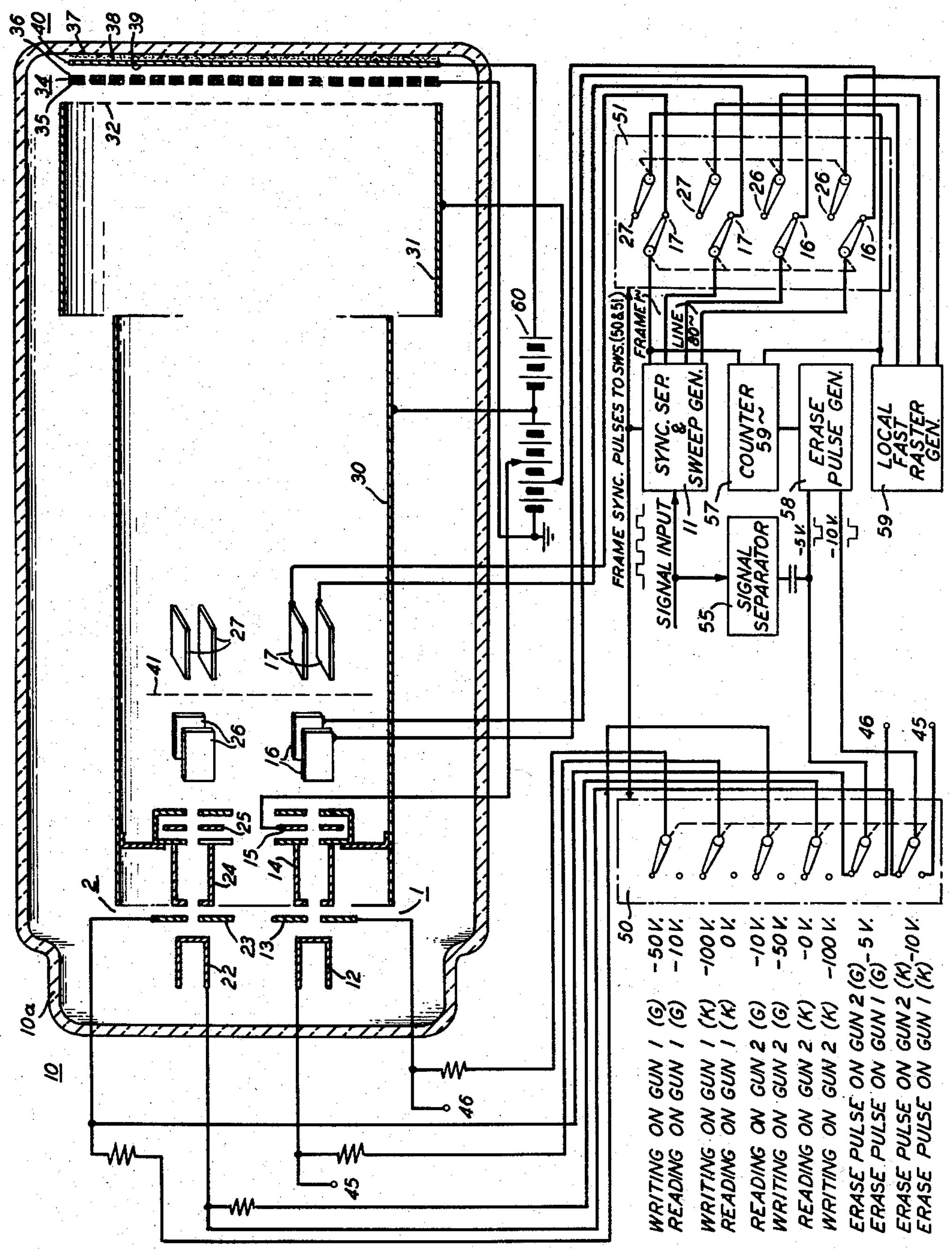
Fig. 2 is a schematic representation of a storage tube and associated circuitry illustrative of one specific embodiment of our invention.

Fig. 2 shows a storage type display tube 10 illustrative of one specific embodiment of this invention and having an evacuated envelope 10*a* preferably of glass surrounding two electron gun assemblies 1 and 2, deflection plate pairs 16 and 17 for gun 1 and 26 and 27 for gun 2, a collimating lens structure 30—31, aperture mask 32, storage grid 34 and luminescent screen 40, in that order from left to right. The storage grid 34 comprises a metallic grid 36 upon which is deposited by evaporation, for example, a suitable secondary electron emissive dielectric material 35, such as the fluoride of calcium or magnesium. This coating of dielectric material has a uniform thickness which is preferably of the order of a few microns. The luminescent screen 40 comprises a phosphor layer 38 deposited on the glass face plate 37. A thin aluminum layer 39 is deposited on the phosphor layer 38 by one of the methods known in the art. The two electron gun assemblies are identical; accordingly, to facilitate the description of the guns, similar elements in the two guns are identified by reference numbers having the same last digit. Electron guns 1 and 2 each comprises a cathode 12, 22, an aperture grid 13, 23, which regulates the intensity of electron flow entering accelerator anode 14, 24, and an aperture electrode 15, 25, which focuses the beam to the desired fineness at the target end of the tube. Heater elements and associated supports for the cathodes and other elements have not been shown since they are well known in the art and may be of conventional design. The associated circuitry illustrated consists of sync separator and sweep generator 11, switches 50 and 51, signal separator 55, counter 57, erase pulse generator 58, and local fast raster generator 59. Sweep generator 11 is utilized for generating sweep voltages during the writing cycle while fast raster generator 59 is employed for generating sweep voltages during the reading and erasing cycles. Signal separator 55 removes the pulse train from the incoming image signal before it is applied in an alternate fashion to the aperture grids of the respective guns. Counter 57 is utilized to define the period of the erase cycle, and to trigger erase pulse generator 58 at such times. Accordingly, the erase pulse generator applies the proper erase pulses to the cathode and grid of whichever gun is in the read condition at such times. Switches 50 and 51 are utilized to change the operating condition of the respective electron guns and associated deflection plates so as to attain the particular sequence of operation desired in an alternate synchronous manner.

To facilitate an understanding of the circuitry depicted in Fig. 2, direct connections have been shown from switch 50 to only those elements of the respective guns that are necessary for one particular sequence of operation. Hence, the terminals designated 45 and 46 emanating from switch 50 are directly associated with the terminals having like numerical designations extending from the gun end of the storage tube. Also, for simplicity, direct connections have only been shown from switch 51 to the deflection plates of gun 1, it being assumed as understood, that similar connections from the two pairs of terminals designated 26 and 27 in switch 51 to the respective pairs of deflection plates designated 26 and 27 of gun 2 are necessary.

For purposes of more fully explaining the operation of this tube in accordance with a set of chosen potentials for the various tube elements, it will be helpful to envisage an insulating material used as the dielectric on the storage grid which has a secondary emission ratio of unity when the impinging electrons are either at 50 volts or 3000 volts. This means that the number of secondary electrons emitted equals the number of impinging electrons when the potential of the cathode with respect to the storage grid is either 50 volts (the first crossover point) or 3000 volts (the second crossover point). These characteristics are typical of the insulating materials utilized in practice such as quartz, glass, or a refractory oxide. Knowing the potential of the first crossover point, it follows and is well known in the art that when the chosen insulating material is struck by a beam of primary electrons of less than 50 volts energy, that surface has a secondary emission ratio less than unity and so charges negatively toward the cathode potential. However, when the insulating material is struck by a primary electron beam of more than 50 volts energy, it has a secondary emission ratio greater than unity and so charges positively towards the second crossover point (assumed for purposes of explanation to be 3000 volts). Of course, in practice the high potential portion of the characteristic curve is modified substantially by the presence of a collector of secondary electrons in close proximity to the storage grid. The collector potential sets the upper limit that the storage grid may attain, since the collector being of a conductive material, conducts all of the secondary electrons emitted. In accordance with this specific embodiment of this invention, the aperture grid 32 serves as the collector of secondary electrons. With these characteristics in mind, a typical but by no means essential set of operating potentials for achieving the desired operation will be meaningful.

The tube elements that remain at a constant potential during all conditions of operation are the accelerating and focusing electrodes of both guns, the collimating lens, the metallic backplate of the storage grid, and the aluminum layer of the luminescent screen. The constant potentials applied to these elements may be derived from a voltage source such as multitapped supply battery 60. Typical but by no means essential values for the voltages applied to the constant potential elements in accordance with one embodiment of this invention may be as follows:

2000 volts on the accelerating anode and accordingly, on the first section of collimating lens 30,
500 volts on the focusing electrode 15, 25,
300 volts on the second section of collimating lens 31 and accordingly, on the aperture mask,
5000 volts on the aluminum layer of the luminescent screen and ground or reference potential on the metallic backplate 36 of the storage grid.

As a starting point, the operating cycle will be considered with gun 1 in the write condition and gun 2 in the read condition in accordance with the position of the switching circuitry depicted in Fig. 2. Switches 50 and 51 have placed gun 1 in the write condition by receiving a frame pulse derived from sync separator 11 which separates the pulse train from the television signal transmitted. The image signal applied to aperture grid 13 of gun 1 is derived from signal separator 55 which removes the pulse train from the image signal and applies it through the appropriate contacts of switch 50 to the proper grid of each gun. In order more fully to explain the operation of this invention, a simplified means for switching has been illustrated in Fig. 2, and some typical but by no means critical voltages have been chosen for the variable-potential tube elements. It should be emphasized that while switches 50 and 51 have been depicted as six ganged and four ganged double banked reciprocal mechanical switch elements, in practice they would advantageously comprise logic and switching circuits of types well known in the art. The switching and logic circuits used in practice to duplicate the function of switches 50 and 51 in Fig. 2, would be actuated by frame sync pulses derived from the sync separator circuit.

In accordance with the characteristics of the storage grid envisioned above, the cathode of gun 1 in the write condition is biased 100 volts negative with respect to the storage grid at which potential the secondary emission ratio of the insulating elements of the storage grid is greater than unity. Since the secondary emission ratio is greater than unity, the insulating elements will tend to charge toward the potential of the aperture mask which also is the collector of secondary electrons in this specific illustrative embodiment of the invention. It is recognized that the aperture mask need not be at the same potential as the collimating lens which it encloses but could be interposed between the storage grid and collimating lens with a separate grid enclosing the collimating lens if desired. To control the intensity of the beam so as to be relatively fine and responsive to an image signal, the aperture grid of gun of gun 1 is biased 50 volts negative. The bias voltages for both the cathode and grid are supplied through the appropriate contacts of switch 50 which is actuated once each second by synchronized frame pulses. This one second interval between frames is not critical but has been chosen as a typical period of time for purposes of illustration. During this one second, the modulated pencil beam from gun 1 is caused to scan one interleaved area of the storage grid (such as the "*b*" areas in Fig. 3) once while in the write condition; this interleaved area is only utilized in accordance with our invention by the beam from gun 1. The scanning rate is synchronized with the sweep voltages utilized by the camera tube at the transmitting end so that one complete picture is stored between shutter pulses which occur once each second. A typical scanning rate for writing may consist of a raster having 80 lines per second to assure storage of a suitable number of picture elements. These sweep voltages are generated by sync separator and sweep generator 11.

During the same interval of time, gun 2 is placed in the read condition by the application of suitable bias voltages being applied to the cathode and grid of gun 2 through the appropriate contacts of switch 50. For reading, it is desirous that the cathode potential with respect to the storage grid be at approximately zero potential. Thus, the reading beam electrons have a low velocity as they approach the target surface. The electrostatic fields produced by the stored charges are thus able to control by coplanar grid action the number of electrons penetrating through each of the openings of the storage grid and the corresponding number reflected. The resulting variation in the reading beam currents which emerge from the storage grid constitute the electrons impinging on the luminescent screen for visual reading. As previously mentioned, the slow arrival rate of incoming picture information, as of the order of one picture each second, necessitates a slow scanning rate for the gun in the write condition. Accordingly, the sweep potentials applied to the gun which is writing the information will be synchronized with the sweeps applied to the camera tube at the transmitter end. However, the picture information being displayed from the previously stored frame must not be at a rate below the flicker frequency. In the ordinary direct view storage tube the display electrons are obtained from a flood gun which provides a continuous output from all storage elements. In this specific embodiment of this invention, only pencil beams exist; thus, it is necessary to sweep the pencil beam in the reading operation in a scanning raster fashion and fast enough to eliminate flicker in the visual output. Accordingly, it is not necessary for the reading beam to be in focus. This is fortunate since the individual guns may then be focused for the optimum writing operation and any defocusing which may occur exists in the reading condition. It should be noted that for reading, switch 51 has applied sweep voltages from the local fast raster generator 59 which sweeps out a raster at a typical rate of sixty times each second. Since each raster for purposes of illustration consists of eighty lines, sixty complete scans each second will result in the generation of approximately 5000 lines per second. It has been found that this rate of scanning, while in no way critical, reproduces a picture having suitable resolution for our purposes.

The erase cycle is actually accomplished during part of the reading cycle. It is achieved by utilizing the sixtieth scan in the read condition for sweeping out a relatively high density unmodulated beam to erase any charge pattern remaining on the particular interleaved areas of the storage grid just read. The grid and cathode potentials for the erasing cycle are applied as 5 and 10 volt negative pulses, respectively. They are achieved by the utilization of a counter 57 which counts 59 cycles and then actuates an erase pulse generator 58 which in turn supplies the 5 volt and 10 volt negative pulses to the grid and cathode respectively through the appropriate contacts of switch 50. Since this erase cycle actually consists of the last one-sixtieth of a second of the reading cycle, it in no way requires nor effects the operation of switch 50 which is only actuated once each second by the frame pulse derived from sync generator 11. While one-sixtieth of a second has been chosen for the erase cycle it may well be that under certain operating conditions two-sixtieths of the reading cycle or in other words, two complete scans of the storage screen by the relatively high density unmodulated electron beam may be desired. It can be seen that with bias potentials of 10 volts negative and zero volts applied to the grid and cathode respectively in the read condition, momentary pulses of 10 volts negative and 5 volts negative to these same elements will actually change the bias potential of the grid to 15 volts negative and the cathode to 10 volts negative. This results in the erasing beam impinging on the storage screen at a higher velocity and tending to charge the storage grid negatively toward the cathode potential, namely, 15 volts negative. This negative 15 volt potential difference between the cathode and the storage grid assures the neutralization of any positive stored charge pattern remaining on the insulating elements of the storage grid after reading.

Upon completion of one complete frame of picture information being stored by gun 1, a subsequent frame pulse derived from the pulse train of the incoming image signal actuates switches 50 and 51 which in turn applies a new set of voltages to the respective guns and deflection plates. With these new potentials, gun 1 which was previously in the write condition is now in the read condition and commences scanning the same area of the storage grid to transfer a visual picture onto the luminescent screen in accordance with the charge pattern previously stored. At the same time, gun 2 is in the write condition with a new image signal applied to the aperture grid for setting down a charge pattern corresponding to the light variations of a new scene, which is actually one of a succession of still pictures transmitted. Thus, it is seen that the combination of two off-axis electron guns independently controlled, a collimating lens structure and an aperture mask permits the storing, viewing and erasing, independently, of two separate and distinct frames of picture information.

Since in accordance with one aspect of this invention the cathode potential of each gun is varied to obtain the desired potential difference with respect to the storage grid to provide the function desired, the potentials applied to collimating lens sections 30 and 31 are common for both guns and are not changed for the different functions. Beam collimation requires specific potentials on collimating lens sections 30 and 31 relative to the cathode potential. Accordingly, collimation can be best for only one of the functions. The transmission characteristics of the storage grid require that the reading function be selected as the one for which good beam collimation exists. This is necessary since the cut-off properties of the storage grid depend on the electron approach velocity normal to the storage screen, and any variation in the approach angle as a function of distance off the axis will appear as shading in the visual output.

Since the potentials for the erase operation are approximately those for reading, collimation is also satisfactory during the erase cycle. During the writing cycle, the velocity with which electrons land on the storage grid is high; therefore, imperfect collimation effects are not troublesome.

Figure 3:
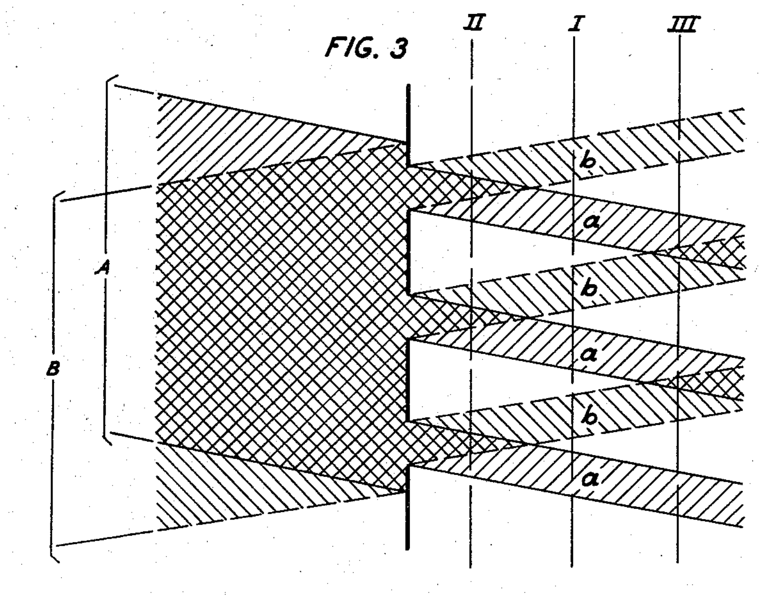
Fig. 3 is a graphical illustration of the effect that the aperture mask has on the passage of electrons.

Fig. 3 illustrates more fully what effect the aperture mask has on establishing two distinct but interleaved rasters on the storage grid. It is seen that plane I is a region where the beams passing through the same aperture are separate and interleaved. In contrast, in plane II, "A" and "B" beams passing through the same aperture intermingle while in plane III, beams passing through adjacent apertures combine. Thus, it is apparent that by dimensioning the distances between apertures properly, taking into consideration the angle of electron approach to the aperture mask, planes beyond the aperture mask can be found such as plane I, in which the beams are separated. It is in such a region that the storage grid 34 is located in accordance with one aspect of this invention. The separate regions of the storage grid seen by the "A" electrons are marked "*a*" while the "*b*" storage surface regions are those seen only by the "B" electrons. Utilization of an aperture mask has the further advantage over a conventional method of interlaced scanning in that successive tracking by the respective beams over the exact interleaved storage areas (such as "*a*" and "*b*" areas depicted in Fig. 3) is assured. Fig. 3 illustrates this point by emphasizing that the beam diameter is larger than the aperatures of the mask; thus, any variations in the sweep voltages resulting in small variations in tracking will not be detected on the surface of the storage grid.

As can be appreciated from Fig. 3, when the storage grid 34 is located at or adjacent the I plane, the electron beams "A" and "B" from, respectively, electron guns 2 and 1, impinge on distinct and different areas of the storage grid. Accordingly there is no interaction at the storage grid between the two beams when one electron gun is storing and the other reading or transferring information, each being operable on its distinct associated areas or sections of the storage grid. This is attained, in accordance with our invention, by proper correlation of the off-axis position of the electron guns, and thus the angle at which the electron beams intercept the aperture mask, the distance of the storage grid behind the mask, as illustrated in Fig. 3, and the physical dimensions of the various elements. It should be noted, that the inherent deflection and aperture lens effects which exist in the aperture mask-storage grid region have been found not to impair the operation of the tube.

Figure 4:
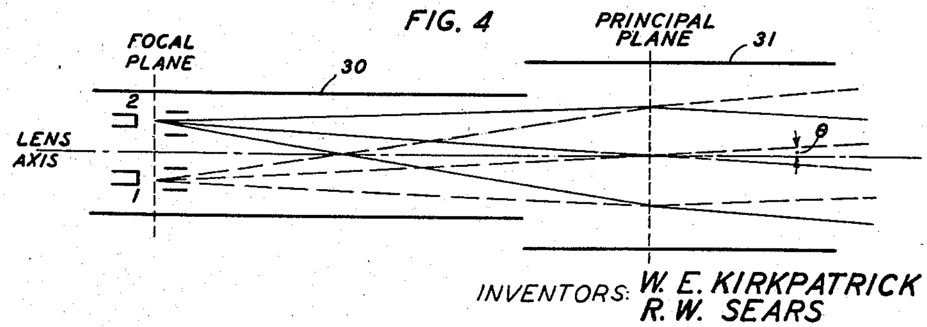
Fig. 4 is a graphical illustration of the focusing effect of a collimating lens on electrons passing through a point in the focal plane but not on the tube axis.

Fig. 4 emphasizes a feature of the illustrative embodiment of the present invention by showing the focusing effect on two electron beams by the use of a collimating lens structure. It can be seen from this figure that when two electron beams pass through points in the focal plane but not on the axis of the collimating lens they also emerge from the lens in parallel paths but at an angle to the axis. The angle $\theta$ seen in Fig. 4, of the electron paths with respect to the lens axis, is that whose tangent is the ratio of the distance of the object off the axis to the distance between the appropriate focal plane and corresponding principal plane. Thus, since the angles of the respective collimated beams are constant throughout the complete scan, and equal but oppositely inclined, the beams will pass through the aperture mask and impinge on the surface of the storage grid with a high degree of accuracy in spacing in a distinct interleaved manner.

It is to be understood that the specific embodiment described is merely illustrative of the general principles of the present invention. Various other arrangements may be devised in the light of this disclosure by one skilled in the art without departing from the spirit and scope of this invention. For example, in the described embodiment of this invention, a single gun provides the write, read and erase functions for each of the interleaved storage areas. However, it will be apparent to a worker skilled in the art that a separate gun could be used for the read and erase operations if mounted in the collimating lens focal plane and at the deflection center of each writing gun. In this manner, two flood guns mounted near the deflection plates so that the flood beams originate in plane 41 and as close as possible to the individual writing gun axis would be satisfactory for the reading and erasing operations. Additionally, in the described embodiment of the present invention, the aperture mask 32 which also serves as a collector of secondary electrons is connected to and encloses the far end of the collimating lens structure. This arrangement necessitates the potential applied to the aperture mask to be the same as applied to the collimating lens structure. However, it is quite apparent to anyone in the art that a separate grid structure could be utilized to enclose the collimating lens, thereby making it possible to interpose the aperture mask between this additional grid and storage grid. By isolating the aperture mask, a potential could be applied to the mask that perhaps under certain operating conditions would be more desirable in serving as a collector than would the potential applied to the collimating lens, which is restricted by the geometric dimensions and specific configurations of the tube elements. Further, it is possible to utilize an aperture mask having a series of slits perpendicular to the diametral plane containing the electron guns. This would have the advantage of giving increased light output since less of the reading current would be intercepted. Other changes will appear to one skilled in the art.

What is claimed is:

1. An electron discharge storage tube comprising an evacuated envelope, a pair of electron guns at one end of said envelope, control means for modulating the electron beams of said guns alternately in accordance with signals applied thereto, a collimating lens system, an aperture mask at the target end of said lens system providing a predetermined path for electron beam flow from the respective electron guns, said guns being symmetrically displaced with respect to the axis of said lens system, a storage grid positioned parallel to and opposite the gun side of said aperture mask, different areas of said storage grid being charged alternately by the modulated electron beam from each of said electron guns, a luminescent screen positioned at the opposite end of the evacuated envelope from said electron guns and parallel to said aperture mask and storage grid, and deflection means for sweeping out two distinct interlaced rasters from said guns simultaneously but at different rates on defined areas of said storage grid.

2. A cathode ray tube comprising an evacuated envelope, a luminescent screen at one end of said envelope, a storage screen spaced apart from said luminescent screen and positioned in a plane substantially parallel thereto, a pair of identical electron guns at the opposite end of said envelope symmetrically displaced with respect to the axis of said envelope for producing and projecting pencil electron beams against the surface of said storage grid, deflection means for sweeping out two distinct interlaced and interleaved rasters simultaneously on said storage grid but at different rates, control means for modulating the electron beams of said guns in accordance with a signal applied thereto, one of said beams storing a charge pattern on one interleaved area of said storage grid while the second of said beams is simultaneously transferring from the second interleaved area of the storage grid onto the luminescent screen a charge pattern stored during the previous frame, a collimating lens system interposed between said deflection means and said storage grid for focusing said pencil beams projected from the respective guns at equal and opposite off-axis deflection angles, and an aperture mask at the end of said collimating lens opposite said electron guns, said mask being positioned in a plane substantially parallel to said storage grid and spaced from said storage grid a distance to insure impingement of said beams on distinct sections of said storage grid.

3. A cathode ray tube in accordance with claim 2 wherein the collimating lens structure consists of first and second cylindrical lens members of conducting material, said cylindrical lens members being coaxial and positioned adjacent each other, the first of said cylindrical lens members enclosing both electron gun assemblies and deflection means and said second cylindrical lens member being of a large diameter but of shorter longitudinal length and having its end opposite the electron guns enclosed by said aperture mask.

4. In a slow speed television system, an electron discharge storage device comprising a luminescent screen for displaying a visual image, a storage grid adjacent said screen and including an insulating material on its surface remote from said screen, an aperture mask adjacent said storage grid, collimating lens means, a pair of substantially identical electron guns for projecting pencil electron beams through said aperture mask and against said storage grid, said guns being positioned on opposite sides of the axis of said lens means and equidistant from said axis, electron deflection means for each of said beams, means for causing said deflection means to scan said beams at one rate for storing a charge pattern on said storage grid, means for causing said deflection means to scan said beams repetitively at a faster rate to transfer a stored charge pattern from said grid to said screen, and means for alternatively connecting said deflection means to said slower and faster scanning means, said last mentioned means reversing the connections on completion of one scan by said slower scanning means.

5. In a slow speed television system, an electron discharge device in accordance with claim 4 further comprising means for erasing any stored charge remaining on said storage grid after said faster scanning but before the reversal of said connections.

6. A direct view storage tube comprising an enclosing envelope, a luminescent screen at one end of said envelope, a storage grid adjacent said screen, a pair of electron guns at the opposite end of said envelope for generating pencil beams, and aperture mask between said guns and said storage grid and adjacent said storage grid, and lens means for focusing each beam along a plurality of parallel paths, the different beams passing through said aperture mask at oppositely inclined angles and impinging on different portions of said storage grid, said guns being symmetrically displaced with respect to the axis of said lens.

7. A direct view storage tube comprising an enclosing envelope, a luminescent screen at one end of said envelope, a storage grid adjacent said screen, a pair of electron guns at the opposite end of said envelope, an aperture mask between said guns and said storage grid and adjacent said storage grid, lens means for focusing each beam along a plurality of parallel paths, the different beams passing through said aperture mask at different angles so as to impinge on different and distinct portions of said storage grid, said guns being symmetrically displaced with respect to the axis of said lens means, means for applying an input signal to one of said guns to cause the beam therefrom to store a charge pattern on certain of said distinct portions of said storage grid, and means for simuletaneously causing electrons to impinge on other of said distinct portions to transfer out the charge pattern priorly stored thereon by the other of said electron guns.

8. A a direct view storage tube in accordance with claim 7 wherein said last mentioned means includes said other electron gun and means for causing the electron beam therefrom to scan said storage grid more rapidly than during storage of a signal thereon.

9. A direct view storage tube comprising an enclosing envelope, a luminescent screen at one end of said envelope, a storage grid adjacent said screen, a pair of electron guns at the opposite end of said envelope, an aperture mask between said guns and said storage grid and adjacent said storage grid, lens means for focusing each beam along a plurality of parallel paths, the different beams passing through said aperture mask at different angles so as to impinge on different and distinct portions of said storage grid, said guns being symmetrically displaced with respect to the axis of said lens means, means for applying an input signal to one of said guns to cause the beam therefrom to store a charge pattern on certain of said distinct portions of said storage grid, means for simultaneously causing electrons from the other of said guns to impinge on other of said distinct portions to transfer out the charge pattern priorily stored thereon by the other of said electron guns, means for causing said beam transferring out the charge pattern to scan said storage grid more rapidly than during storage of a signal thereon, and means for erasing a signal stored on said storage grid after the transfer therefrom of said signal and before storage thereon of the next input signal, said erasing means including means for counting the number of scans of said electron beam during said transfer of said stored signal.

10. A storage tube comprising a storage electrode, lens means, an aperture mask between said lens means and said storage electrode, and a pair of electron guns opposite said storage electrode for projecting oppositely inclined electron beams through said aperture mask and against said storage electrode, said electron guns being symmetrically displaced with respect to the axis of said lens means and said storage electrode being positioned from said aperture mask a distance such that electron beams from said electron guns impinge on different and distinct portions of said storage electrode.

11. A storage tube in accordance with claim 10 further comprising means for alternately applying input signals to said electron guns alternately to store information on said distinct portions of said storage electrode.

12. A storage tube in accordance with claim 11 further comprising a luminescent screen adjacent said storage electrode and means for causing electrons to transfer said information stored on one of said distinct portions of said storage electrode to said luminescent screen during the time of storage of information on the other of said distinct portions of said storage electrode.

13. A storage tube in accordance with claim 12 wherein said last mentioned means also includes said electron guns and means for applying different potentials to said electron guns for storage and transfer of information at said storage electrode.

14. A storage tube in accordance with claim 13 further comprising means for applying potentials to said electron guns for erasing stored information at said distinct portions of said storage electrode and means for activating said erasing means at each of said guns after transfer of said information by said guns and before storage of subsequent information by said guns.

15. A storage tube comprising a storage electrode, lens means, an aperture mask between said lens means and said storage electrode, a luminescent screen adjacent said storage electrode, a pair of electron guns opposite said storage electrode for projecting electron beams through said aperture mask and against said storage electrode, said electron guns being symmetrically displaced with respect to the axis of said lens and said storage electrode being positioned from said aperture mask a distance such that electron beams from said guns impinge continuously on different and distinct portions of said storage electrode, means for transferring information from one set of distinct portions of said storage grid to said luminescent screen while information is being stored on the other of said distinct portions, means for erasing information from each set of distinct portions, and means for activating said erasing means after transfer of said information from each set of distinct portions and before storage of the subsequent information at each set of distinct portions.

References Cited in the file of this patent

UNITED STATES PATENTS

| | | |
|---|---|---|
| Re. 22,734 | Rosenthal | Mar. 19, 1946 |
| 2,238,137 | Struhig et al. | Apr. 15, 1941 |
| 2,276,359 | Von Ardenne | Mar. 17, 1942 |
| 2,532,339 | Schlesinger | Dec. 5, 1950 |
| 2,556,824 | Schade | June 12, 1951 |
| 2,618,762 | Snyder | Nov. 18, 1952 |
| 2,761,089 | Haeff | Aug. 28, 1956 |
| 2,790,929 | Herman et al. | Apr. 30, 1957 |
| 2,857,551 | Hansen | Oct. 21, 1958 |